US012600423B2

(12) United States Patent　　　　　(10) Patent No.:　US 12,600,423 B2
Collignon et al.　　　　　　　　　　　(45) Date of Patent:　　Apr. 14, 2026

(54) CHASSIS, CONVERTED FOR A BATTERY ELECTRIC VEHICLE

(71) Applicant: TROVA COMMERCIAL VEHICLES INC., Dublin, VA (US)

(72) Inventors: Patrick Collignon, Dublin, VA (US); Maxell Collignon, Dublin, VA (US)

(73) Assignee: TROVA COMMERCIAL VEHICLES INC., Dublin, VA (US)

( * ) Notice: Subject to any disclaimer, the term of this patent is extended or adjusted under 35 U.S.C. 154(b) by 280 days.

(21) Appl. No.: 18/549,602

(22) PCT Filed: May 5, 2022

(86) PCT No.: PCT/US2022/027844
§ 371 (c)(1),
(2) Date: Sep. 8, 2023

(87) PCT Pub. No.: WO2022/235913
PCT Pub. Date: Nov. 10, 2022

(65) Prior Publication Data
US 2024/0166283 A1　　　May 23, 2024

Related U.S. Application Data

(60) Provisional application No. 63/184,343, filed on May 5, 2021.

(30) Foreign Application Priority Data

Jul. 22, 2021　(BE) .................................. 2021/0050

(51) Int. Cl.
　*B62D 65/10*　　　(2006.01)
　*B60K 1/00*　　　(2006.01)
　*B62D 21/02*　　　(2006.01)

(52) U.S. Cl.
CPC ................ *B62D 65/10* (2013.01); *B60K 1/00* (2013.01); *B62D 21/02* (2013.01)

(58) Field of Classification Search
CPC ........ B62D 65/10; B62D 21/02; B62D 65/00; B62D 21/12; B60K 1/00; B60Y 2200/1422; B60Y 2304/078
See application file for complete search history.

(56) References Cited

U.S. PATENT DOCUMENTS 4,397,476 A　*　8/1983　Bolyard ............... B62D 63/061
　　　　　　　　　　　　　　　　　280/149.2
5,042,831 A　*　8/1991　Kuhns .................... B62D 21/14
　　　　　　　　　　　　　　　　　280/786

(Continued)

FOREIGN PATENT DOCUMENTS

CN　　　101588955 B　*　2/2011　............. B62D 21/14
DE　　　2601087 A　*　7/1976

(Continued)

OTHER PUBLICATIONS

FR-3036331-A1 English Translation (Year: 2016).*

(Continued)

*Primary Examiner* — Michael T. Walsh
(74) *Attorney, Agent, or Firm* — HoustonHogle LLP

(57)　　　　　ABSTRACT

A chassis frame structure consisting of the merger of two chassis frames with different widths, which include a module to facilitate the difference in size as well as integrate an electric motor drive solution for the purpose of battery electric commercial vehicles. The module mounting structure includes a plurality of brackets allowing for form-fit assembly of an existing vehicle chassis frame with a new pre-assembled chassis frame.

10 Claims, 4 Drawing Sheets

(56)     References Cited

U.S. PATENT DOCUMENTS

| | | | | |
|---|---|---|---|---|
| 11,807,302 B2 * | 11/2023 | Harmon | ................. | B62D 21/12 |
| 2007/0176406 A1 * | 8/2007 | Ruehl | .................... | B62D 21/02 |
| | | | | 280/785 |
| 2008/0236910 A1 | 10/2008 | Kejha et al. | | |
| 2018/0334190 A1 * | 11/2018 | Davis | .................... | B62D 65/00 |

FOREIGN PATENT DOCUMENTS

| | | | | | | |
|---|---|---|---|---|---|---|
| EP | 1767443 | A1 | | 3/2007 | | |
| FR | 3036331 | A1 | * | 11/2016 | .............. | B60K 1/04 |
| JP | 6269047 | B2 | * | 1/2018 | | |
| WO | WO-2007090187 | A2 | * | 8/2007 | ............. | B62D 21/12 |

OTHER PUBLICATIONS

JP-6269047-B2 English Translation (Year: 2018).*
WO-2007090187-A2 English Translation (Year: 2007).*
DE-2601087-A English Translation (Year: 1976).*
CN-101588955-B English Translation (Year: 2011).*
International Search Report and Written Opinion of the International Searching Authority, mailed on Aug. 16, 2022, from International Application No. PCT/US2022/027844, filed on May 5, 2022. 14 pages.
International Preliminary Report on Patentability, mailed on Nov. 16, 2023, from International Application No. PCT/US2022/027844, filed on May 5, 2022. 8 pages.

\* cited by examiner

CHASSIS, CONVERTED FOR A BATTERY ELECTRIC VEHICLE

RELATED APPLICATIONS

This application is a § 371 National Phase Application of International Application No. PCT/US2022/027844, filed on May 5, 2022, now International Publication No. WO 2022/235913, published on Nov. 10, 2022, which International Application claims the benefit under 35 USC 119(e) of U.S. Provisional Application No. 63/184,343, filed on May 5, 2021, and claims priority to Belgian Patent Application No. BE 2021/0050, filed on Jul. 22, 2021, all of which are incorporated herein by reference in their entirety.

FIELD OF THE INVENTION

The present invention relates to a chassis for a vehicle, converted such that it can be used for a battery electric vehicle. More in particular the invention relates to such chassis and the corresponding method for converting the chassis of a vehicle, in particular a truck, powered by a combustion engine, to a vehicle, in particular a truck, powered by an electromotor. Still more in particular, the invention relates to a method whereby a part of the chassis of the truck is retained and is joined to a new chassis part by means of a merger module.

The invention also relates to a chassis manufactured according to this method, as well as to a vehicle powered by an electromotor, comprising such chassis.

Differently phrased, the invention relates to a dual function merger module for two different chassis frames for the conversion of an Internal Combustion Engine (ICE) chassis frame to a Battery Electric Vehicle (BEV) chassis frame. Said application would occur when two chassis frames with different widths need to be joined together for the purpose of converting ICE vehicles to BEV's to facilitate modular assembly. The merger module facilitates the difference in size as well integrates an electric motor drive solution for said conversion.

BACKGROUND OF THE INVENTION

It is common practice in the commercial vehicle industry to build a vehicle chassis consisting of a frame structure with two opposing side rails or longitudinal frame rails running along the length of the vehicle. Said longitudinals are usually L or C shaped and may get doubled up to increase strength and load bearing capacity. These longitudinal frame rails are joined together by at least one or more connecting members, known as crossmembers. Within this industry, it is a recognized practice to utilize cross members that are located on the inside of the chassis frame, i.e. they have cross members with 2 outer surfaces that join up to the inner surfaces of the frame rails to make up the body of the chassis frame structure. Such cross members are designed to stiffen the frame. Traditional types of crossmembers eliminate the possibility of component installation between the chassis rails from the forward-facing or rear-facing ends of the chassis frames, and instead, need to be accessed from the upper or lower direction.

GOAL OF THE INVENTION

For battery electric and other alternative drive commercial vehicles it is of key importance to develop such frame structure so to maximize the available space between the longitudinal frame rails in order to increase battery packaging density. Only in this manner maximum battery capacity can be reached.

In converting ICE vehicles to BEV's, modifications to the existing chassis structure may be required. After such conversion, the chassis structure comprises a front section and a rear section, in which the rear section is a part of the original ICE chassis structure and the front section is a new chassis structure to accommodate the BEV powertrain more optimally.

The terms front and rear section should be understood as being the front and rear section of the chassis, viewed in the driving direction of the vehicle.

It is the goal of the invention to find an optimized way of mounting these two chassis frames together with improved results in ergonomics, less material and component waste, shorter assembly lead-times, less assembly costs and provide improved robustness and torque strength to support a central electric motor installation. The way such frames are joined and its location will make a great deal of difference in overall chassis strength and level of complexity of operation. The location and mounting of the electric drive motor is of particular importance for a battery electric vehicle as it will cause high torques on the frame, exceeding the one caused by the traditional diesel driveline.

The present invention relates to a chassis design and a method for manufacturing such chassis, for such a converted new vehicle that allows the assembly of a wider frame to be connected to a cut-off chassis frame of an existing commercial vehicle, providing for a less complex and improved way of recuperating components of the original vehicle.

SUMMARY OF THE INVENTION

The goal of the present invention is to offer a solution to the abovementioned and related drawbacks, as a method along claim 1 is offered.

To that end, the present invention relates to a method for converting an ICE chassis frame to a BEV chassis frame, comprising the following steps:

a) shortening the chassis of the ICE vehicle to a chassis part (10) whereby:
    the front axle and the corresponding part of the chassis carrying the combustion engine, is removed, and
    The rear axle (or rear axles) and suspension and the corresponding part of the chassis with longitudinals (60) is retained;

b) building of a new chassis-part (20), comprising longitudinals (70) and crossmembers (120), c) building a merger module (50), comprising one or more motor mounting plates (90) and one or more spacer (s)—connecting brackets (80);

d) mounting of an electric motor (40) on the motor mounting plates (90) of the merger module (50), and e) connecting the merger module with:
    the longitudinals (60) of the shortened chassis-part (10), positioned at the inner side of the merger module (50), and
    the longitudinals (70) of the new chassis-part (20), positioned at the outer side of the merger module (50),
    by means of the connecting means (100).

According to a preferred embodiment of the method of the invention, the steps d and e are performed after execution of the steps a, b and c.

According to a further preferred embodiment of the invention, the method comprises the additional step that the batteries for the electric power train are placed in the space formed between the longitudinals (70) of the new chassis-part (20).

The invention also relates to a chassis, manufactured according to the methods abovementioned.

The invention also relates to a battery powered vehicle, comprising the chassis manufactured according to the method of the invention.

More in particular the invention relates to the method(s), the chassis and the vehicle as set forth in the appended claims.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicated otherwise. It will be further understood that the terms "comprises" and or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A chassis frame comprising of a plurality of one or more U-shaped cross members and two longitudinal frame rails, is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or descriptions below.

In order to further illustrate the invention, hereinafter some preferred embodiments are described of the method for the manufacturing of a converted chassis according to the invention.

The present invention relates to a method for the manufacturing of a converted chassis for a battery electric powered vehicle.

The invention also relates to a merger module that enables two different chassis parts to be joined to one integrated chassis for a battery electric powered vehicle.

This integrated chassis comprises two parts:

A first (rear) part consisting the rear part of the chassis of the original, to be converted, internal combustion engine powered vehicle; and A second (front) part consisting of a new chassis part.

The rear part of the chassis of the original vehicle comprises the rear axle(s) and suspension of this vehicle and is completely recycled or re-used as this original chassis part is cut-off before the rear axle(s) and suspension.

The term "rear part" hereby relates to the rear part of the chassis of the original vehicle, seen in the driving direction of the vehicle.

The second part, namely the new chassis, comprises two longitudinal rails, hereinafter referred to as longitudinals, running in the longitudinal direction of the vehicle, at either side.

These longitudinals are connected to each other by connecting members, cross-wise positioned, hereinafter referred to as cross-members.

As set forth above, the BEV chassis frame comprises off the rear part of the ICE chassis frame, and a new front chassis frame. The rear part of the ICE chassis frame includes the axle and suspension mounting of the original ICE vehicle, and will be fully recuperated from the original vehicle by means of cutting-off the old chassis frame in front of the rear axle and suspension mounting. The new front chassis frame consists of 2 lateral frame rails running in the longitudinal direction of the vehicle, separated by cross members to maximize the inner space to increase storage and installation of battery packs up to the beginning of the rear section. Said spacing is wider than the original ICE chassis frame. On these lateral frame rails, a new front axle and suspension gets mounted in combination with any other hardware and subassemblies related to the design of the BEV powertrain design. Said BEV chassis frame is designed to achieve a cost-effective solution to recuperate as much as possible of the original ICE chassis frame, while creating the inner front chassis frame space needed for an enhanced and maximized battery storage preferred for a BEV chassis frame.

In embodiments of the invention, the mounting process to the new frame can be categorized as new practices in the industry consisting of two procedures; preparation work and final assembly. Whereas the preparation work consists of both the pre-assembly of the new front chassis frame and the cut-off of the original ICE chassis frame, the final assembly work consists of a cost effective, self-positioning mounting of the original ICE chassis frame into the pre-assembled new frame to form the BEV chassis frame.

Once merged, both frames are joined together through the use of fasteners such as bolts and nuts, running through a merger module. The location at which point these two frames are fastened together is referred to as the "Merger Point".

In embodiments of the invention, the merger point will be the location of the mounting of the central electric motor drive. The mounting brackets of the electric motor drive will be integrated into the pre-assembly of the merger module, and therefore will be designed in a way it allows for the mechanical support of the motor drive, potentially its power electronics while providing high torsion strength to the original rear end of the ICE chassis frame, and reducing stress on the new front chassis frame.

In embodiments of the invention, the merger module, possibly consisting of several brackets, can be pre-assembled onto the rear end of the original ICE chassis frame, which allows for the front connection of a pre-assembly of a new front chassis frame. This subassembly allows for the difference in frame width and for easy of assembly to form fit the actual merger point, providing tight tolerance matching and secure a stable connection of the 2 frames to each other. Said merger module will be designed in a way it allows for self-positioning or form-lock of the rear ICE chassis frame and the new front chassis frame to create the BEV chassis frame.

In embodiments of the invention, the mounting of the two chassis frames as well as the mounting of the electric motor, through the means of combined fasteners allows for a more ergonomic, quality secured and cost-effective assembly operation. The advantage of this design is that modular assembly is facilitated.

BRIEF DESCRIPTION OF THE DRAWINGS

Any advantages and industrial significances of the present invention will be described with reference to embodiments shown on the following drawings, on which.

In these figures use has been made of the following reference signs:

(10) refers to the shortened part of the chassis of the original, to be converted, ICU-powered vehicle; to this part of the chassis reference is also made as the rear part of the converted chassis;

(20) refers to the new chassis-part; to this part of the chassis reference is also made as the front part of the converted chassis;

(30) refers to the connection point of both parts of the new chassis;

(40) refers to the electric motor;

(50) refers to the merger module;

(60) refers to the shortened longitudinals in the rear part of the converted chassis;

(70) refers to the new longitudinals in the front part of the converted chassis;

(80) refers to the spacers, positioned between the old and the new longitudinals, also serving as connection brackets or braces;

(90) refers to mounting plates, used in the merger module, for the mounting of the electric motor;

(100) refers to the connection means, for example bolts and nuts;

(110) also refers to connection means, for example bolts and nuts;

(120) refers to the new cross-members in the front part of the converted chassis.

DETAILED DESCRIPTION BY REFERENCE TO THE FIGURES

Figure 1:
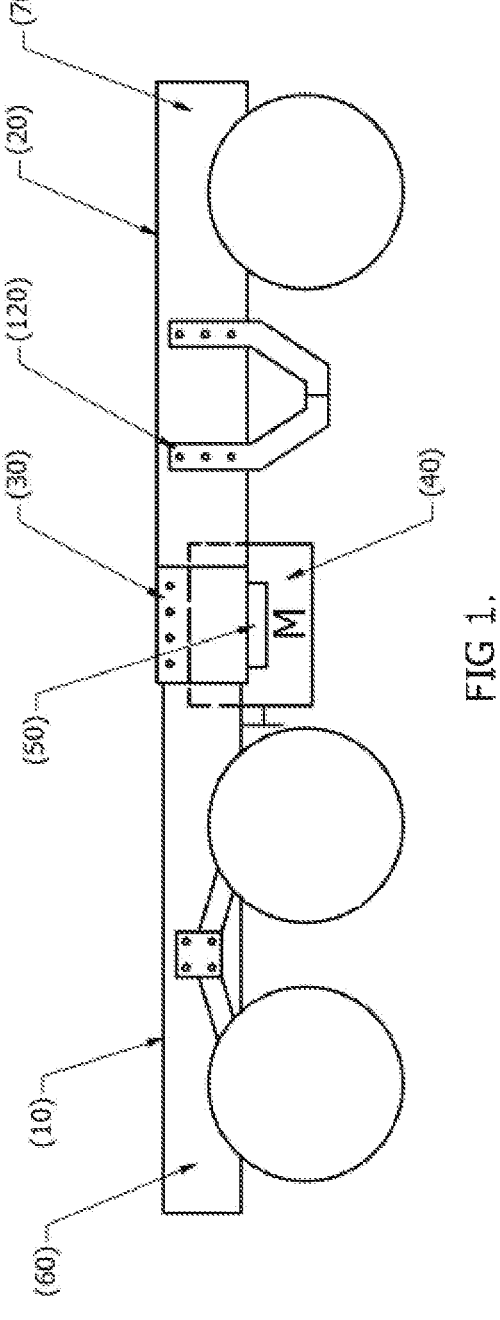
FIG. 1 is the right hand side view of the cross-chassis frame for a Battery Electric Commercial Vehicle, consisting of a cut-off chassis frame of an existing commercial vehicle, merged with a newly purpose build front chassis frame section.

The present invention will now be described by referencing the appended figures representing preferred embodiments. FIG. 1 shows the side view connection of the BEV chassis frame, consisting of the rear end of the cut-off ICE vehicle chassis frame 10 attached to a front section of the new longitudinal frame rails 20 which are connected by respective crossmembers. At the Merger Point 30, the section where the two longitudinal frame rails are connected to the rear end of the ICE chassis frame, the electric drive unit or electromotor 40 is mounted to the dual function merger module 50, as to provide optimal strength and transfer of torque to the original ICE chassis frame 10 and to avoid exerting torsion on the front longitudinal frame rails 20.

Figure 2:
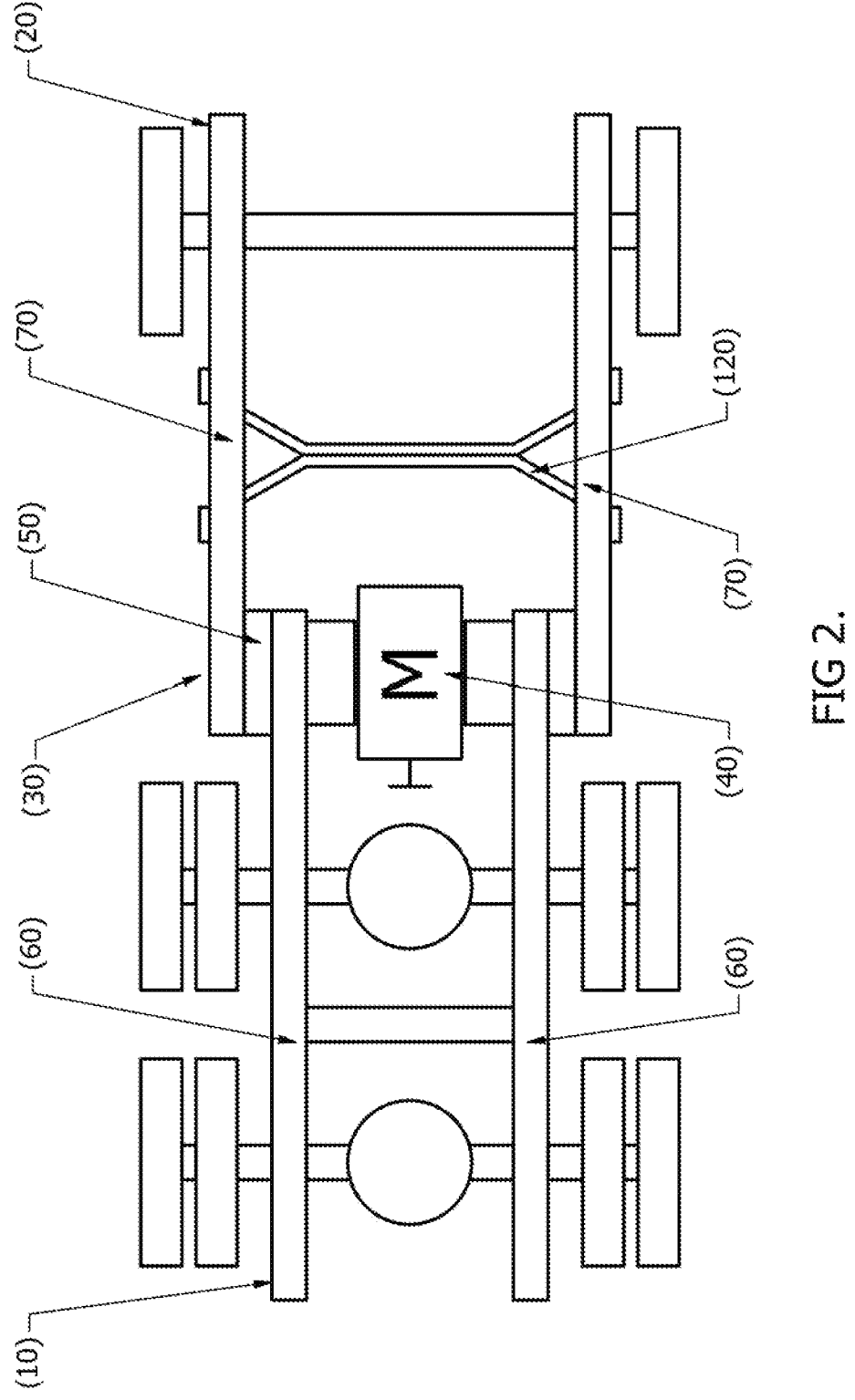
FIG. 2 is the top view of the assembly of the cut-off rear end of the ICE chassis frame with the front new longitudinal frame rails, using the dual purpose merger module.

Referring now to FIG. 2, in an advantageous embodiment of the invention, the top plan view shows how the dual function merger module allows the rear end of the cut-off ICE chassis frame 10 to attach to the front section of the wider longitudinal frame rails 20 to increase the available space between the chassis rails for battery electric driveline components such as batteries and power electronics. The assembly of the rear end of the ICE chassis frame 10 and the wider longitudinal frame rails 20 make up the BEV chassis frame. The connection is achieved by creating the merger module in such a way, through a plurality of brackets, that these chassis frames with different widths can be assembled while incorporating the mounting of the electric drive unit 40.

Figure 3:
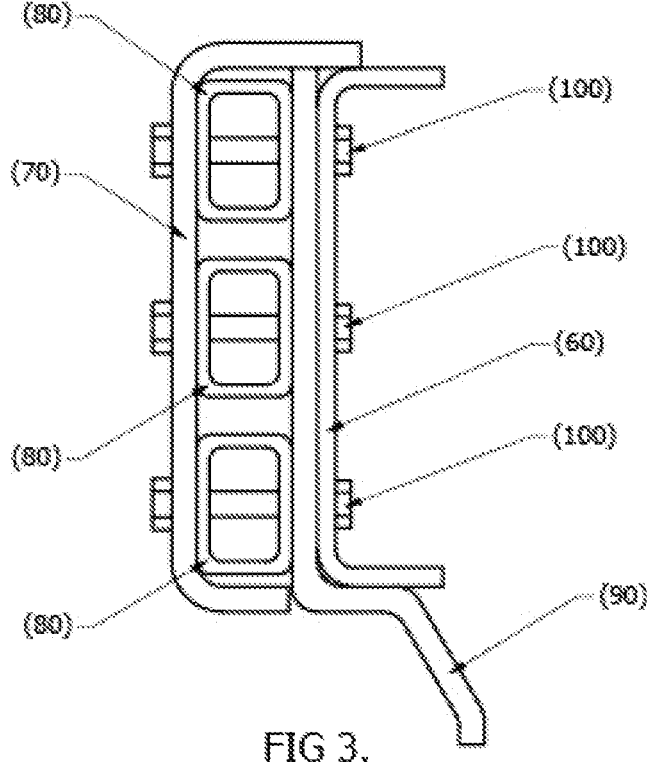
FIG. 3 is a cross section view of the dual purpose merger module with the motor mount bracket.

Referring now to FIG. 3 showing a cross section of a potential merger module, consisting of a longitudinal 60 in the forward facing direction of the rear end of the cut-off CE chassis frame 10, the longitudinal 70 of the new front chassis frame 20 and the plurality of brackets 80 needed to bridge the distance between both chassis frames. The plurality of brackets of the dual function merger module 50 are attached to the motor mounting plate 90 for the electric motor 40. All these components are mounted together by a series of shared fasteners 100 There are many different engineering solutions to create the correct spacing distance for the dual function merger module 50 and their attachment to the motor mounting plate 90. In FIG. 3 the spacers are consisting of tubes welded to the motor mounting bracket.

Another advantageous embodiment of the invention is the form fit of the actual merger point for improved ergonomics, providing tight tolerance matching and secure a stable connection of the 2 frames to each other. Both frame rails of the front longitudinal 70 and the longitudinal of the cut-off ICE chassis frame 60 have a U shape, where the rails are oriented in such a way that the flanges are running on the top and bottom in the forward facing direction. Referring to FIG. 3, it is possible to see that the inner surface of the upper flange of the front longitudinal 70 is touching the outer surface of the upper flange of the longitudinal 60 from the cut-off ICE chassis frame. The merger module will be designed in a way it allows for self-positioning or form-lock of the rear ICE chassis frame and the new front chassis frame to create the BEV chassis frame.

Figure 4:
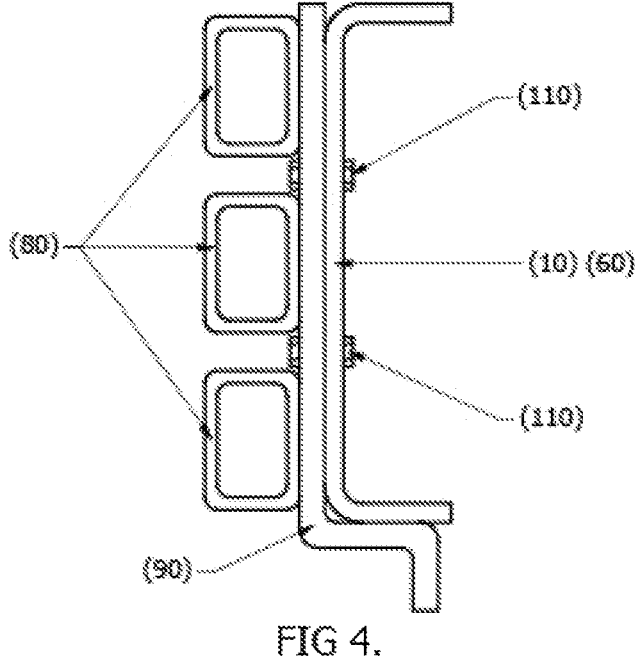
FIG. 4 shows the pre-assembly of the Chassis Slot Section to the chassis frame of the existing vehicle.

Another advantageous embodiment of the invention, referring to FIG. 4, showing a cross section of a subassembly of the dual function merger module 50, is the improved ergonomics for installation of the new front chassis frame 20, to the rear cut-off ICE chassis frame 10, by allowing subassembly. Given the pre-assembly of the merger module 50 made up of the motor mounting plate 90 and the plurality of brackets 80, to the cut-off ICE chassis frame 10, the new front longitudinal frame rails 20. Can be slid over the pre-assembly, after which both frames are fastened together 100, forming the new BEV chassis frame.

What is claimed is:

1. A method for converting an internal combustion vehicle chassis frame to a battery electric power vehicle chassis frame, comprising the following steps:

a) shortening the internal combustion vehicle chassis frame to a shortened chassis part whereby:

the front axle and the corresponding part of the chassis carrying the combustion engine, is removed, and the rear axle(s) and suspension(s) and the corresponding part of the chassis with longitudinals is retained;

b) building a new chassis-part, comprising longitudinals and crossmembers;

c) building a merger module, comprising one or more motor mounting plates and one or more spacer(s) connecting brackets;

d) mounting an electric motor on the motor mounting plates of the merger module; and e) connecting the merger module with:

the longitudinals of the shortened chassis-part, positioned at the inner side of the merger module, and the longitudinals of the new chassis-part, positioned at the outer side of the merger module, by means of connecting means.

2. Method according to claim 1, wherein the steps d and e are performed after execution of the steps a, b, and c.

3. Method according to claim 1, comprising the additional step that the batteries of the battery electric power vehicle are placed in the space formed between the longitudinals of the new chassis-part.

4. Method according to claim 1, wherein the longitudinals of the shortened chassis-part and the longitudinals of the new chassis-part, are U-shaped, the opening of both of said U-shaped rails longitudinals being oriented to the inner side of the chassis.

5. Method according to claim 1, wherein a top flange of the U-shape of the longitudinals of the new chassis-part has a greater width than a bottom flange of the U-shape of the longitudinals of the new chassis-part, a bottom surface of the top flange of the new chassis-part being placed on a top surface of a top flange of the longitudinal of the shortened chassis-part.

6. Chassis, wherein the chassis is manufactured according to claim 1.

7. Battery electric vehicle, wherein the battery electric vehicle comprises the chassis according to claim 6.

8. Battery electric vehicle according to claim 7, wherein the vehicle is a truck.

9. Battery electric vehicle according to claim 7, wherein the connection means are formed by bolts and nuts.

10. A method for converting an internal combustion vehicle chassis frame to a battery electric power vehicle chassis frame, the method comprising:

a) removing a front axle and part of the chassis carrying the combustion engine and retaining one or more rear axles and suspensions and a corresponding part of the chassis with longitudinals is retained;

b) building a new chassis-part, comprising longitudinals and crossmembers;

c) building a merger module, comprising one or more motor mounting plates and one or more spacers;

d) mounting an electric motor on the motor mounting plates of the merger module; and e) connecting the merger module with the longitudinals of the chassis-part, positioned at the inner side of the merger module and the longitudinals of the new chassis-part, positioned at the outer side of the merger module.

\* \* \* \* \*